United States Patent [19]

Neko

[11] Patent Number: 4,837,490
[45] Date of Patent: Jun. 6, 1989

[54] CONTROL METHOD FOR AN INJECTION MOTOR OF AN INJECTION MOLDING MACHINE

[75] Inventor: Noriaki Neko, Hachioji, Japan

[73] Assignee: Fanuc Ltd., Minamitsuru, Japan

[21] Appl. No.: 224,881

[22] PCT Filed: Jan. 29, 1988

[86] PCT No.: PCT/JP88/00080

§ 371 Date: Jul. 11, 1988

§ 102(e) Date: Jul. 11, 1988

[87] PCT Pub. No.: WO88/05720

PCT Pub. Date: Aug. 11, 1988

[30] Foreign Application Priority Data

Feb. 3, 1987 [JP] Japan .................................. 62-21835

[51] Int. Cl.⁴ ............................................. G05B 19/42
[52] U.S. Cl. .................. 318/568.1; 318/571; 318/636; 318/578; 164/155; 364/476
[58] Field of Search .............. 318/471, 472, 473, 571, 318/578, 599, 568, 642, 636; 364/476; 164/4.1, 155, 457

[56] References Cited

U.S. PATENT DOCUMENTS

| | | | |
|---|---|---|---|
| 2,832,108 | 4/1958 | Vossberg | 318/471 X |
| 4,279,151 | 7/1981 | Anderson | 164/4.1 |
| 4,437,046 | 3/1984 | Faillace | 318/571 |
| 4,493,362 | 1/1985 | Moore et al. | 164/457 |
| 4,558,421 | 12/1985 | Shriver | 364/472 X |
| 4,597,048 | 6/1986 | Mazur et al. | 164/4.1 X |

Primary Examiner—Benjamin Dobeck
Attorney, Agent, or Firm—Staas & Halsey

[57] ABSTRACT

A control method for an injection motor is capable of preventing the injection motor from overheating. Injection motor current values are sampled at intervals having a predetermined sampling cycle. The value for each interval is squared and the squares are summed up over an injection molding cycle time and multiplied by the predetermined sampling time cycle. A ratio of an amount of heat produced when a continuous rated current flows and that produced when a maximum current flows is also determined. The injection molding cycle time is then subtracted from a value obtained by dividing the above-mentioned multiplied sum by the product of the above-mentioned ratio and the square of the maximum current. A determination is made as to whether the sign of the resultant value is positive or negative. When the sign is positive the motor is in its overheating state, and a quiescent time is provided to lengthen the injection molding cycle time (steps S8–S11).

9 Claims, 2 Drawing Sheets

CONTROL METHOD FOR AN INJECTION MOTOR OF AN INJECTION MOLDING MACHINE

BACKGROUND OF THE INVENTION

1. Field of the Invention

The present invention relates to a control method for an injection motor of an injection molding machine, and more particularly, to a control method for an injection motor, which is capable of preventing the motor from overheating.

2. Description of the Related Art

In an injection molding machine, as is generally known, an injection motor is used as a drive source for an injection unit, and processes of injection, hold, and application of back pressure for metering are executed by the injection motor. In the injection molding machine of this type, the output torque of the injection motor is small, so that a very small driving current flows through the injection motor when the back pressure is applied. In the injection and hold process, a large output torque must be produced, so that a very large driving current flows through the injection motor. Meanwhile, the injection motor is selected in consideration of various design conditions, such as economic efficiency. It is not common, therefore, to use, as the injection motor, a large-capacity motor such that its continuous rated current is never exceeded by the driving current. As a result, the driving current during the injection and hold processes may possibly exceed the continuous rated current by a large margin, so that the average value of the driving current flowing through the injection motor during one injection molding cycle may sometimes exceed the continuous rated current. In such a case, since the amount of heat produced is in proportion to the square of the driving current, the injection motor may overheat or be subject to other troubles.

Control methods of an injection motor of a type capable of determining whether or not an injection motor can overheat have been proposed by the present applicant (Japanese patent application Nos. 61-72416 and 61-155174). These methods were created on the basis of recognition that a large driving current flows during the hold process and a value of the driving current during the same process is in proportion to a preset hold pressure. According to these methods, on one hand, the square of a preset hold pressure is multiplied by a hold time to obtain a first value which is in proportion to an amount of heat produced in one injection molding cycle, and on the other hand, the square of a pressure produced when an injection motor delivers its maximum torque or when a continuous rated current flows in the motor is multiplied by one cycle time to obtain a second value determination is made as to whether a ratio of the first value to the second value is less than a predetermined value to determine whether or not the injection motor can overheat.

However, according to these proposed methods, only approximation of heat produced by the injection motor is obtainable.

SUMMARY OF THE INVENTION

The object of the present invention is to provide a control method for an injection motor of an injection molding machine which is capable of controlling the injection motor on the basis of an amount of heat produced by the injection motor, which is obtained from the driving current flowing through the same motor, so as to prevent the motor from overheating.

In order to achieve the above object, a control method for an injection motor, according to the present invention, comprises steps of: (a) sampling and detecting, at intervals having a predetermined period, a value of current flowing through the injection motor; (b) adding respective squared products multiplying an associated one of the current values and multiplying the sum by the predetermined period, to obtain a first value; (c) determining whether or not the injection motor is in an overheating state, on the basis of a ratio of said first value to first predetermined determination value; and (d) setting a quiescent time to lengthen an injection molding cycle time, when said step (c) that the injection motor is in the overheating state.

According to the present invention, as described above, a determination is made as to whether or not the injection motor is in its overheating state on the basis of the driving current flowing through the injection motor, and the quiescent time is provided in the injection molding cycle time when the injection motor can overheat, to thereby automatically prevent overheating of the same motor. Accordingly, it is possible to prevent the operation of an injection molding machine from being interrupted due to occurrence of overheating of the injection motor.

DESCRIPTION OF THE PREFERRED EMBODIMENT

Figure 3:
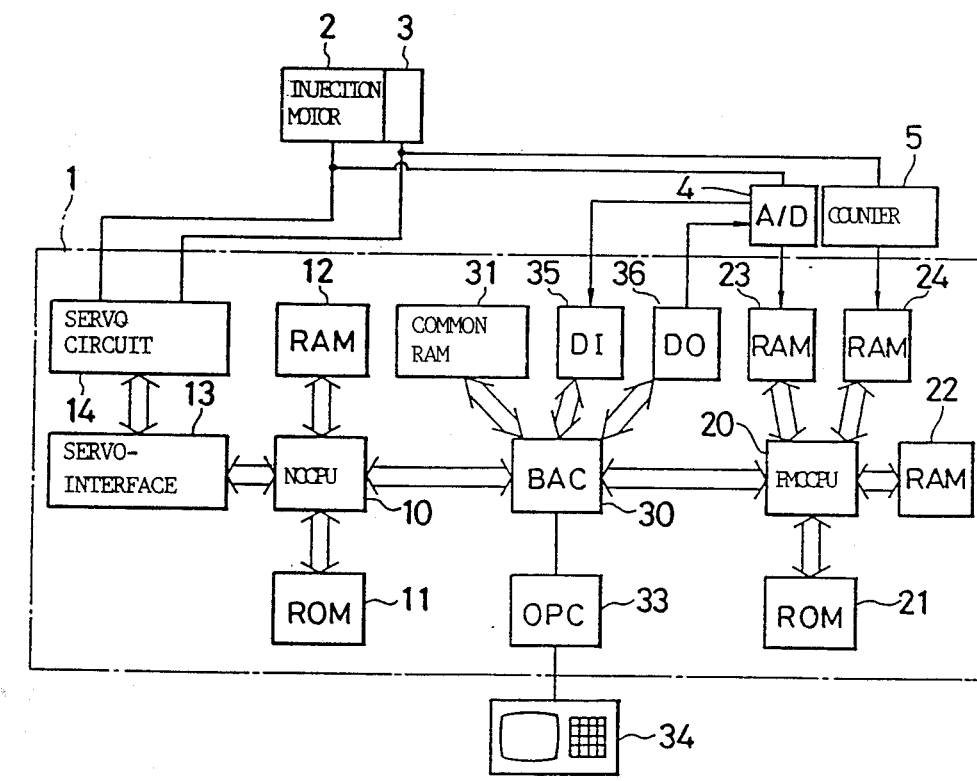
FIG. 3 is a schematic view showing the principal part of an injection molding machine to which the control method according to the aforesaid embodiment is applied.

FIG. 3 shows a principal part of an injection molding machine to which is applied an injection motor control method according to the present invention. The injection molding machine is arranged so that the drive of servomotors, used to drive various axes for injection, clamping, screw rotation, and ejector operation, and of various actuators (among which only an injection motor 2 for driving a screw in an injecting direction is shown) is controlled by a numerical control unit (hereinafter referred to as NC unit) 1 with a computer housed therein. The NC unit 1 includes a microprocessor (hereinafter referred to as NCCPU) 10 for numerical control and another microprocessor (hereinafter referred to as PMCCPU) 20 for programmable machine control.

Connected to the NCCPU 10 are a ROM 11, which stores a control program for generally controlling the injection molding machine, and a RAM 12 for temporarily storing data during various arithmetic processes. Also, servo circuits for the various axes (among which only a servo circuit 14 for the injection motor 2 is shown) are connected to the NCCPU 10 through a servo interface 13. On the other hand, connected to the PMCCPU 20 are a ROM 21 which stores a program for setting a quiescent time (discussed later) and a sequence program for the injection molding machine or the like; a RAM 22 for temporally storing the result of arithmetic operations; a RAM 23 for storing an output value of an A/D converter 4, mentioned later, which is arranged to effect sampling of the driving current of the injection motor 2 at a predetermined sampling cycle and to convert the current sampled into a corresponding digital signal; and a RAM 24 for storing a value supplied from a counter 5 at a predetermined cycle indicative of the present screw position, the same counter being arranged to count pulses supplied from a position detector 3 which is mounted on the injection motor 2. Connected through buses to both the CPUs 10, 20 is a bus-arbiter controller (hereinafter referred to as BAC) 30 to which a nonvolatile common RAM 31, having a backup battery, for storing various control programs for the control of operations of the injection molding machine and for storing various preset values mentioned later; an operator panel controller 33 connected with an MDI/CRT 34; an input circuit 35; and an output circuit 36. The above-mentioned A/D converter 4 is provided with a timer, and is arranged to operate for a time period, set by the timer, starting at the instant that a command for A/D conversion is supplied from the PMCCPU 20. The A/D converter 4 supplies a signal indicative of completion of the A/D conversion to the input circuit 35 when the time period is up. In addition, although an illustration is omitted, various actuators and the like are connected to the input/output circuits 35, 36.

Figure 1:
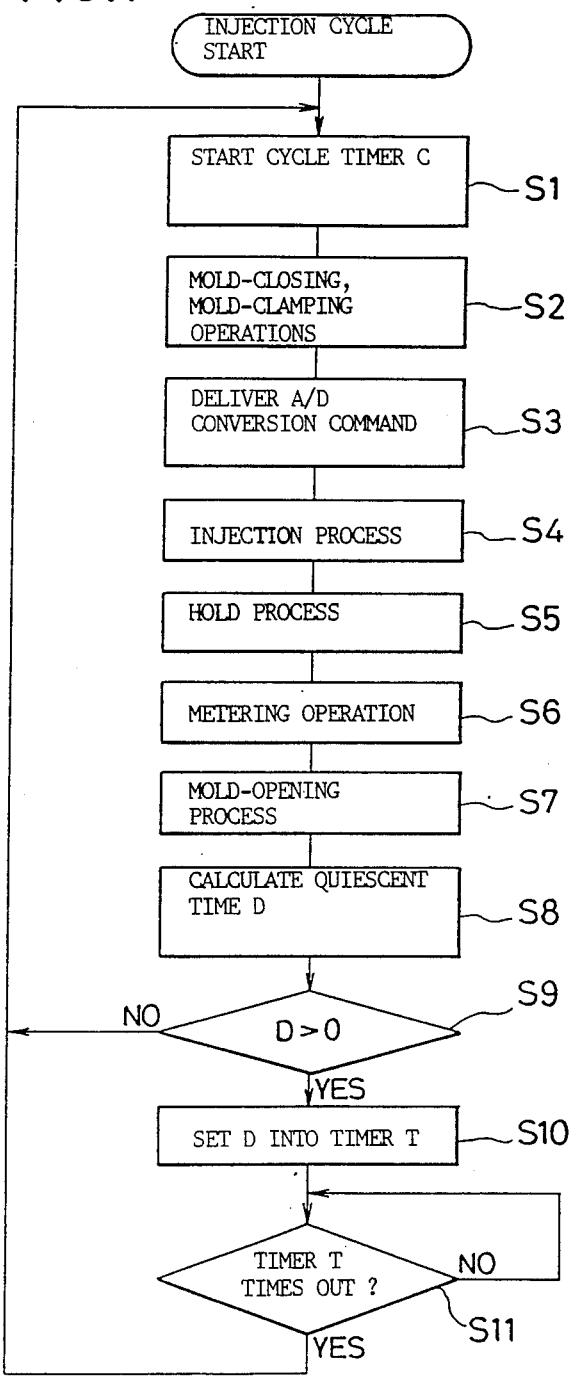
FIG. 1 is a flow chart of a control program for effecting an injection motor control method according to an embodiment of the present invention.
Figure 2:
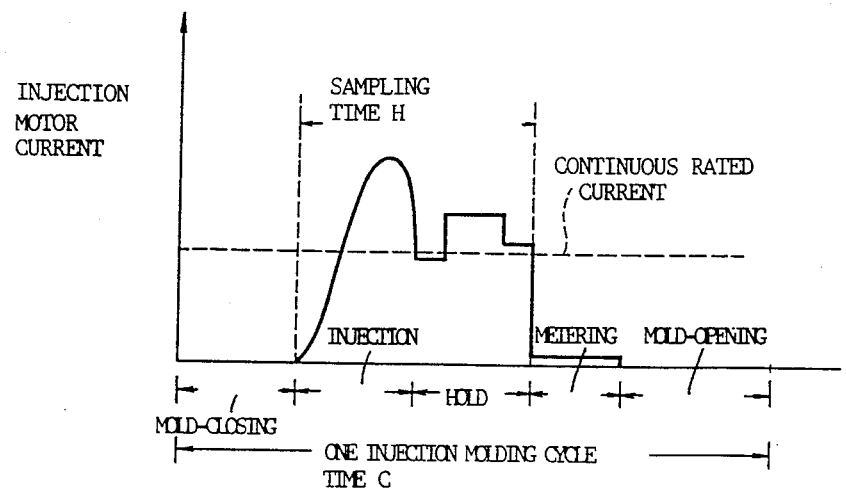
FIG. 2 is a diagram for illustrating the concept of injection motor control according to the aforesaid embodiment of FIG. 1.

Referring to FIGS. 1 and 2, injection motor control executed by the injection molding machine with the aforementioned construction will be described.

In the injection molding machine, an injection molding operation for producing one molding product, i.e., one injection molding cycle, consists of mold-closing, injection, hold, metering, and mold-opening processes. In this injection molding cycle, little driving current flows in the injection motor 2 during the mold-closing and opening processes, and a small current flows for application of a back pressure. Accordingly, a large current flows in the injection motor 2 only when the injection and hold processes are carried out, as shown in FIG. 2 (plotting the injection motor driving current in the ordinate, and one injection molding cycle time in the abscissa).

Incidentally, such a large driving current may not flow in the injection process in some cases. Depending on the molding product, only a short injection time may be required, without the need of a large torque.

By considering the fact that a memory means having a large storage capacity is required to store respective sampling data of the injection motor driving current over the entire of one injection molding cycle time period and that an amount of heat, produced during the mold-closing, mold-opening, and metering processes where little driving current flows, is negligible in measuring the heat amount of the injection motor, the present embodiment is arranged to effect the sampling of the injection motor driving current for a period of time starting at the start of the injection process and ending at the start of metering process at which the hold process ends.

Here, symbol C represents an ordinary value of one injection molding cycle time period starting from the start of the mold-closing process and ending at the completion of the mold-opening process. Symbol W represents an amount of heat generated from the injection motor in a certain molding cycle. Symbol $i_k$ represents a value of the injection motor driving current sampled at the k-th sampling in that molding cycle. Symbol $i_{max}$ represents the maximum current which is permitted to flow through the injection motor 2. Symbol H represents a sampling time starting at the start of the injection process and ending at the start of the metering process, and symbol $\tau$ represents a sampling period. Assuming these representations, the following proportional relationship shown by equation (1) is fulfilled because an amount of heat generated from the motor for one molding cycle is in proportion to an integration of the square of motor driving current over the molding cycle time.

$$W \propto \tau \sum_{k=0}^{H/\tau} i_k^2 \tag{1}$$

On the other hand, in case the injection motor is supplied with the maximum current $i_{max}$ for one injection molding cycle, the following proportional relationship shown by equation (2) is fulfilled.

$$W' \propto C \cdot i_{max}^2 \tag{2}$$

When the ratio of W/W' (hereinafter referred to as duty ratio $\theta$) is calculated, the resultant duty ratio $\theta$ varies as a function of the injection motor driving current $i_k$ as shown in the following equation (3) because a factor, which depends on motor resistance affecting an amount of heat, is eliminated.

$$\theta = \tau \sum_{k=0}^{H/\tau} i_k^2 / (C \cdot i_{max}^2) \tag{3}$$

Further, the following equation (4) is fulfilled, if the duty ratio $\theta$ for that time period, which is equal to the sum of one injection molding cycle time C and a injection motor quiescent time D starting at the completion of the cycle time, is equal to the allowable maximum $\theta_{max}$ of the duty ratio.

$$\theta_{max} = \tau \sum_{k=0}^{H/\tau} i_k^2 / (C + D) i_{max}^2 \tag{4}$$

In equation (4), the allowable maximum duty ratio $\theta$ indicates the duty ratio for the case where the injection motor is continually supplied with a continuous rated current $i_R$ for one injection molding cycle ($\theta_{max} = i_R^2 / i_{max}^2$).

By modifying equation (4), we obtain the following.

$$\theta_{max} = \tau \sum_{k=0}^{H/\tau} i_k^2 / \{(C + D) i_{max}^2\} \tag{4}$$

From equation (5), we obtain the following.

$$C + D = \tau \sum_{k=0}^{H/\tau} i_k^2 / (i_{max}^2 \cdot \theta_{max}) \tag{5}$$

If the quiescent time D obtained from equation (6) is negative, it is indicated that no overheating state occurs in the present injection molding cycle time C. On the other hand, if the quiescent time D is positive, it is indicated that the injection motor 2 can overheat unless the same quiescent time D is added to the injection molding cycle time C.

In equation (6), the allowable maximum duty ratio $\theta_{max}$ and the maximum current $i_{max}$ permitted to be supplied to the injection motor are known values which are fixedly set in dependence on the specification of the injection motor. Further the one injection molding cycle time period is also known, and further the motor driving current $i_k$ is a value detectable by a sampling operation. Accordingly, the quiescent time D is obtainable by substituting these values into equation (6). Incidentally, since $$D = \left\{ (\tau \sum_{k=0}^{H/\tau} i_k^2/(i_{max}^2 \cdot \theta_{max}) \right\} - C \qquad (6)$$

$\theta_{max} = i_R^2/i_{max}^2$, the denominator of the first term on the right side of equation (6) is represented as follows:

$$\begin{aligned} i_{max}^2 \cdot \theta_{max} &= i_{max}^2 \cdot i_R^2/i_{max}^2 \\ &= i_R^2 \end{aligned}$$

Therefore, the denominator can be represented by the square of the continuous rated current.

FIG. 1 shows a flowchart of a control program, according to an embodiment of the present invention and executed by the CPUs 10, 20 for preventing the injection motor from overheating. Upon supply of a command for injection molding machine operation, at first, the PMCCPU 20 resets a cycle timer C which measures one injection molding cycle time, and causes the same timer to start (the step S1), and further supplies the NCCPU 10 with a command for mold-clamping operation through the BAC 30 and the common RAM 31 (the step S2). Upon receipt of this command, the NCCPU 10 drives the servomotor (not shown) for the clamp axis through the servo-interface 13 and the associated servo circuit (not shown) to effect the mold-closing and mold-clamping operations, and delivers a mold-clamping completion signal to the PMCCPU 20 through the BAC 30 and the common RAM 31 when these operations are completed.

When receiving this signal, the PMCCPU 20 delivers a command for A/D conversion to the A/D converter 4 through the BAC 30 and the output circuit 36 (the step S3). Upon receiving this command, the A/D converter 4 actuates a timer housed therein and carries out the A/D conversion operation for a predetermined timer period (which is set to a value slightly longer than the hold operation period). Then, the PMCCPU 20 delivers an injection command to the NCCPU 10, and in response to this command, the NCCPU 10 drives the injection motor 2 through the servo-interface 13 and the servo circuit 14, to effect injection (the step S4). During this time, the driving current flowing through the injection motor 2 is supplied to the A/D converter 4 and converted into a digital signal. A corresponding value is stored in the RAM 23 for intervals of a predetermined sampling cycle $\tau$. On the other hand, pulses from the position detector 3 are supplied to the counter 5, and the present position value is stored in the RAM 24 at intervals of the predetermined sampling cycle. This data is utilized for displaying on the display screen of the CRT/MDI 34 a relationship between the screw position and the injection motor driving current value. A detailed explanation of this display operation is omitted since such operation does not directly relate to the present invention.

Upon completion of the injection process, the hold process is entered (the step S5), where the operation of the A/D converter 4 is continued so that the driving current flowing through the injection motor 2 is sampled during intervals of the predetermined cycle $\tau$, to be stored in the RAM 23. When the hold process completion signal is delivered from the NCCPU 10 after the hold process is completed, the PMCCPU 20 receives this signal through the BAC 30 and the common RAM 31 and delivers a metering start signal. Upon receiving the same signal, the NCCPU 10 drives the servomotor (not shown) for metering and screw rotation, to perform the metering operation (the step S6).

When the metering process is started, the timer in the A/D converter 4 turns off, and the operation of storing the driving current value of the injection motor 2 into the RAM 23 at intervals of the predetermined sampling cycle $\tau$ is terminated. Also at this time, an A/D conversion completion signal is delivered to the input circuit 35. As a consequence, the respective driving currents of the injection motor 2 at the predetermined sampling cycles $\tau$ during the injection and hold procesess have been stored in the RAM 23.

The metering process is followed by the mold-opening process (the step S7). Thereafter, a mold-opening completion signal is received by the PMCCPU 20 through the BAC 30 and the common RAM 31, and the PMCCPU 20 causes the cycle timer C to stop, and executes the calculation in accordance with equation (6) by using a value of the cycle timer C and the respective sampling data $i_k$ stored in the RAM 23 to obtain a quiescent time D (the step S8). More specifically, in equation (6), the allowable maximum duty ratio $\theta_{max}$ and the maximum current $i_{max}$ are fixed values determined in dependence on the specification of the injection motor 2, and hence $i_{max}^2 \cdot \theta_{max} (= i_R^2)$ is also a fixed value. The PMCCPU 20 reads out the respective sampled values $i_k$ stored in the RAM 23 and then multiplies each value by itself, and then calculates the sum of these products for the entire sampling time. Further, the PMCCPU 20 multiplies the thus calculated sum by the sampling period $\tau$, divides the resultant value by the predetermined value $i_{max}^2 \cdot \theta_{max}$, and subtracts the value of the cycle timer C from the thus obtained quotient to calculate a quiescent time D (the step S8). Next, the PMCCPU 20 determines whether the a value of the quiescent time D is positive or negative. If it is determined that the quiescent time D is not positive (the step S9) or if it is indicated that the injection motor 2 is not in its overheating state, the control program returns to the step S1 again to cause the next injection molding cycle to start.

On the other hand, when it is determined that the quiescent time D is positive at the step S9 or when it is indicated that the overheating state is reached if the present injection molding cycle time is kept unchanged, the quiescent time D is set into a timer T (the step S10) which is then started. The next injection molding cycle not entered until after the time set in the timer T has expired (the step S11). In this manner, the quiescent time is provided if the overheating state can be reached to lengthen the resultant injection molding cycle time, to make it possible to prevent the injection motor 2 from overheating.

Although the aforementioned embodiment is arranged to effect the sampling/detection of the driving current flowing through the injection motor 2 during injection and hold operation alone, so that the values detected through sampling can be stored even in the RAM 23 having a small storage capacity, the detection of the injection motor driving current may be made during metering operation and the like by using the RAM 23, which is large in storage capacity.

Furthermore, the quiescent time D may be obtained in accordance with equation (6) after a determination associated with the overheating state is made by comparing a duty ratio $\theta$ obtained from equation (3) with the allowable maximum duty ratio $\theta_{max}$, although, in the aforementioned embodiment, the determination as to whether the quiescent time D is positive or negative is made in accordance with equation (6), for determining presence/absence of an overheating state of the injection motor, and for the determination of the value of the quiescent time D.

I claim:

1. A control method for an injection motor, comprising the steps of:
    (a) sampling and detecting, for intervals having a predetermined period, a value of current flowing through the injection motor;
    (b) adding respective square products of the detected current values to obtain a sum and multiplying the sum by the predetermined period to obtain a first value;
    (c) determining whether or not the injection motor is in an overheating state on the basis of a ratio of said first value to a first predetermined determination value; and
    (d) setting a quiescent time to lengthen an injection molding cycle time, when said step (c) determines that the injection motor is in the overheating state.

2. A control method for an injection motor according to claim 1, wherein said predetermined detection time period is the injection molding cycle time.

3. A control method for an injection motor according to claim 2, wherein said predetermined detection time period starts when an injection process is started and ends when a metering process is started.

4. A control method for an injection motor according to claim 2, wherein said first predetermined determination value is obtained by multiplying the square of a maximum current which is permitted to flow in the injection motor by the injection molding cycle time.

5. A control method for an injection motor according to claim 2, wherein said first predetermined determination value is obtained by multiplying the square of a maximum current which is permitted to flow in the injection motor by a second predetermined determination value, and said step (d) further comprises determining whether a value, obtained by subtracting the injection molding cycle time from a value which is obtained by dividing said first value by said first predetermined determination value, is positive or negative, and setting said quiescent time to a value equal to the value obtained by subtracting when the value is positive.

6. A control method for an injection motor according to claim 5, wherein said second predetermined determination value is a ratio of an amount of heat produced when the injection motor is supplied with its continuous rated current to an amount of heat produced when the injection motor is supplied with the maximum current.

7. A control method for an injection motor according to claim 2, wherein said first predetermined determination value is obtained by multiplying a continuous rated current by itself, and said step (d) further comprises determining whether a value, obtained by subtracting the injection molding cycle time from a value which is obtained by dividing said first value by said first predetermined determination value, is positive or negative, and setting said quiescent time to a value equal to the value obtained by subtracting when the value is positive.

8. A control method for an injection motor for preventing the injection motor from overheating, comprising the steps of:
    (a) sampling and storing a value of a current flowing through the injection motor for a plurality of intervals having a predetermined length during a sampling cycle;
    (b) squaring the stored values and summing the squared values;
    (c) multiplying the sum of the squared values by the predetermined interval length;
    (d) dividing the resulting product of said step (c) by a predetermined value;
    (e) subtracting the sampling cycle period from the result of said step (d);
    (f) automatically adding the resulting time of said step (e) to an injection molding cycle time, to increase the injection molding cycle time for injection molding cycles yet to be performed to prevent overheating of the injection motor, when the resulting time of said step (e) has a positive value.

9. A control method for an injection motor according to claim 8, wherein the predetermined value is the square of a continuous rated current for the injection molding cycle.

* * * * *

UNITED STATES PATENT AND TRADEMARK OFFICE
CERTIFICATE OF CORRECTION

PATENT NO. : 4,837,490

DATED : June 6, 1989

INVENTOR(S) : Neko

It is certified that error appears in the above-identified patent and that said Letters Patent is hereby corrected as shown below:

Col. 1, line 56, after "value" insert --. Further a--.

Col. 2, line 9, delete "multiplying an asso-";
      line 10, delete "ciated one"; after "the" (first occurrence) insert --detected--;
      line 11, delete ",";
      line 14, after "to" insert --a--;
      line 16, after "(c)" insert --determines--.

Col. 3, line 54, "the" should be --an--; delete "of one".

Col. 4, line 40, after "maximum" insert --value--.

Col. 5, line 6, delete "further";
      line 26, after "program" delete ",";
      line 27, delete "and";
      line 30, after "for" insert --an--;

UNITED STATES PATENT AND TRADEMARK OFFICE
CERTIFICATE OF CORRECTION

PATENT NO. : 4,837,490

DATED : June 6, 1989

INVENTOR(S) : Neko

It is certified that error appears in the above-identified patent and that said Letters Patent is hereby corrected as shown below:

Col. 5, line 31, after "measures" insert --the--;
      line 32, "time," should be --time period C,--;
      line 33, change ", and further" to --. Further, the PMCCPU 20--;
      line 34, after "for" insert --the--;
      line 44, "When" should be --Upon--;
      line 60, "of" should be --having--.

Col. 6, line 48, after "the" delete "a".

Signed and Sealed this

Seventh Day of May, 1991

Attest:

Attesting Officer

HARRY F. MANBECK, JR.

Commissioner of Patents and Trademarks